(12) United States Patent
Konishi

(10) Patent No.: US 11,709,951 B2
(45) Date of Patent: Jul. 25, 2023

(54) IMAGE FORMING APPARATUS STORING PRINT DATA IN USER TERMINAL OR STORAGE PART ACCORDING TO STORAGE CONDITION

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 2 days.

(21) Appl. No.: 17/595,554

(22) PCT Filed: May 8, 2020

(86) PCT No.: PCT/JP2020/018672
§ 371 (c)(1),
(2) Date: Nov. 18, 2021

(87) PCT Pub. No.: WO2020/235359
PCT Pub. Date: Nov. 26, 2020

(65) Prior Publication Data
US 2022/0229917 A1    Jul. 21, 2022

(30) Foreign Application Priority Data
May 21, 2019    (JP) .................. 2019-095245

(51) Int. Cl.
| G06F 21/60 | (2013.01) |
| G06F 3/12 | (2006.01) |
| G06K 15/00 | (2006.01) |
| G03G 21/04 | (2006.01) |
| B41J 29/38 | (2006.01) |

(52) U.S. Cl.
CPC ............ *G06F 21/608* (2013.01); *B41J 29/38* (2013.01); *G03G 21/046* (2013.01); *G06F 3/1238* (2013.01); *G06K 15/4095* (2013.01)

(58) Field of Classification Search
None
See application file for complete search history.

(56) References Cited

U.S. PATENT DOCUMENTS

2015/0036184 A1* 2/2015 Hamaguchi ........ H04N 1/32363
358/1.15

FOREIGN PATENT DOCUMENTS

JP        2005-343034 A        12/2005

* cited by examiner

*Primary Examiner* — Thomas D Lee
(74) *Attorney, Agent, or Firm* — Studebaker & Brackett PC

(57) ABSTRACT

A multifunctional peripheral (1) includes a communication part (22), a storage part (21), a free space determination part (25), a confidential document determination part (26), and a storage processing part (27). The free space determination part (25) determines that the storage part (21) contains a free space for storing print data, as a first storage condition. The confidential document determination part (26) determines that the print data is not a confidential document, as a second storage condition. The storage processing part (27) stores the print data in the storage part (21) in association with user information of a user terminal (23) when the first storage condition and the second storage condition are satisfied, and communicates with the user terminal (23) and stores the print data in the user terminal (23) when the first storage condition is not satisfied or when the second storage condition is not satisfied.

8 Claims, 3 Drawing Sheets

IMAGE FORMING APPARATUS STORING PRINT DATA IN USER TERMINAL OR STORAGE PART ACCORDING TO STORAGE CONDITION

TECHNICAL FIELD

The present invention relates to an image forming apparatus provided with a storage part which stores print data received from a user terminal.

BACKGROUND

An image forming apparatus such as a multifunctional peripheral is communicatively connected to a user terminal via a predetermined network. The image forming apparatus receives a print job together with print data from the user terminal and forms an image based on the print data on a sheet. Further, the image forming apparatus stores the print data received from the user terminal in a storage part in association with user information of the user terminal in order to reprint the print data. This eliminates the need for the user terminal to generate the print data again from an original file of the print data.

For example, the image forming apparatus of Patent Document 1 is provided with an individual identification information input means, an individual authentication means, an image forming means, a storage means, and a control means. The individual identification information input means receives an input of individual identification information of a user. The individual authentication means authenticates the user by using the user's individual identification information input through the individual identification information input means. The image forming means forms an image on a recording medium based on image data, and prints the image data. The storage means stores the printed image data. The control means permits only reprinting of the image data stored in the storage means corresponding to the authenticated user as reprinting in the image forming means when the authentication of the user is successful in the individual authentication means.

PRIOR ART DOCUMENT

Patent Document

[Patent document 1] JP2005-343034

SUMMARY OF INVENTION

Problems to be Solved by the Invention

However, the storage part provided in the image forming apparatus cannot store the data exceeding a storage capacity, that is, an area in which data can be stored is limited, and the storage part needs to store various data other than the print data received from the user terminal. Therefore, if there is no free space corresponding to a capacity of the print data, the storage part cannot properly store the print data and cannot reprint the print data.

Further, although the original file of the print data may be created as a confidential document, it is not preferable from the viewpoint of security to store the print data of the confidential document in the image forming apparatus capable of being used by various users. However, if the print data of the confidential document is not stored in the storage part, the print data of the confidential document cannot be reprinted.

It is therefore an object of the present invention to store the print data in a reprintable manner regardless of a state of the storage part or a type of the print data.

Means for Solving the Problems

An image forming apparatus of the present invention includes a communication part, a storage part, a free space determination part, a confidential document determination part, and a storage processing part. The communication part receives print data from a user terminal through a network. The storage part stores the print data received by the communication part. The free space determination part determines that the storage part contains a free space for storing the print data, as a first storage condition. The confidential document determination part determines that the print data is not a confidential document, as a second storage condition. The storage processing part stores the print data in the storage part in association with user information of the user terminal when the first storage condition and the second storage condition are satisfied, and communicates with the user terminal and stores the print data in the user terminal when the first storage condition is not satisfied or when the second storage condition is not satisfied.

Effect of the Invention

According to the present invention, it becomes possible to store the print data in a reprintable manner regardless of a state of the storage part and a type of the print data.

THE MODE FOR CARRYING OUT THE INVENTION

Figure 1:
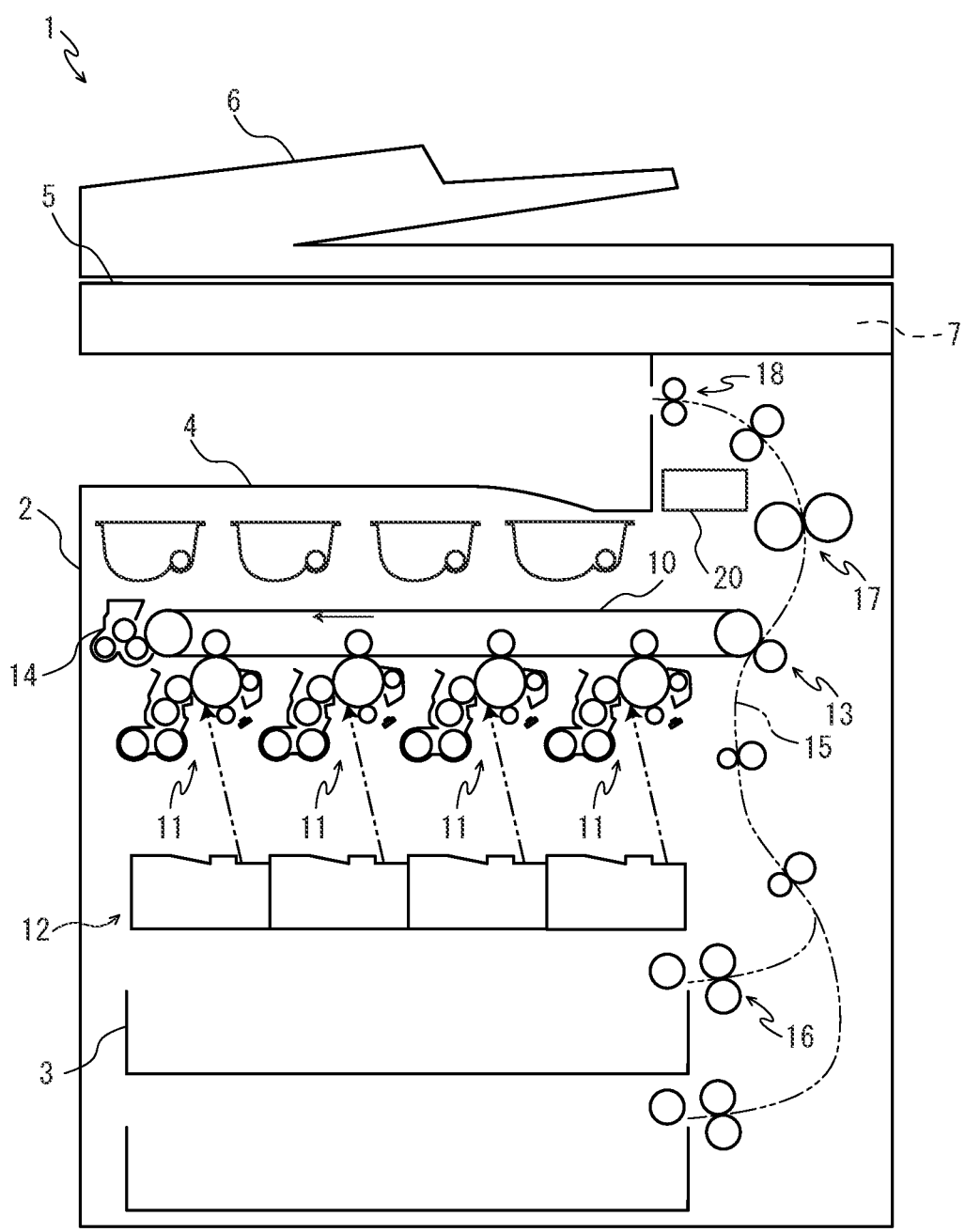
FIG. 1 is a sectional view showing a multifunctional peripheral according to the embodiment of the present invention.

First, an entire structure of a multifunctional peripheral 1 (an image forming apparatus) according to the first embodiment of the present invention will be described with reference to FIG. 1. Hereinafter, for convenience of explanation, a front side of the paper plane on which FIG. 1 is drawn is defined as a front side of the multifunctional peripheral 1. Arrows L, R, U and Lo marked in each figure indicate a left side, a right side, an upper side and a lower side of the multifunctional peripheral 1 respectively.

The multifunctional peripheral 1 includes an approximately box-shaped apparatus main body 2. In the lower portion of the inside of the apparatus main body 2, sheet feeding cassettes 3 which stores a sheet are provided. In an in-body space provided in the upper portion of the apparatus main body 2, a discharge tray 4 is provided.

In the upper portion of the apparatus main body 2, an image reading part 5 which reads a document and obtains image data is provided. The image reading part 5 includes a platen glass and a reading slit on the upper surface. Above the image reading part 5, a document conveyance part 6 which conveys the document so as to pass on the reading slit is provided. The image reading part 5 reads the image of the document placed on the platen glass or the document passing on the reading slit by a scanner and produces the image data. The image reading part 5 and the document conveyance part 6 are operated when a user operates an operation display part 7 to input a copy job or a transmission job.

On the upper portion of the front face of the apparatus main body 2, the operation display part 7 is mounted. The operation display part 7 includes, for example, an operation key such as a ten key, a start key, a system menu key, a transmission key, a copy key and a verification key, and an indicator such as a touch panel, and receives an operation input by the user.

In the center portion of the inside of the apparatus main body 2, an intermediate transfer belt 10 is stretched between rollers. Below the intermediate transfer belt 10, four image forming parts 11 which forms an image are provided for colors (for example, four colors of yellow, magenta, cyan and black) of a toner. Below the four image forming parts 11, an exposure part 12 is provided. On the right end side of the intermediate transfer belt 10, a secondary transfer area 13 is provided. On the left end side of the intermediate transfer belt 10, a cleaning unit 14 which cleans the intermediate transfer belt 10 is provided. The secondary transfer area 13 is formed between a part of the right end portion of the intermediate transfer belt 10 and a secondary transfer roller.

Each image forming part 11 includes a rotatable photosensitive drum as an image carrier, and around the photosensitive drum, a charger, a development device, a primary transfer part, an eraser, and a cleaning device are disposed in the order of the electrophotographic image forming process. Above the development devices, toner containers corresponding to the image forming parts 11 are provided for the colors (for example, the four colors of yellow, magenta, cyan and black) of the toner, and each toner container contains the toner of the corresponding color.

In the right portion of the inside of the apparatus main body 2, a conveyance path 15 for the sheet is provided. On the upstream portion of the conveyance path 15, sheet feeding parts 16 are provided for the sheet feeding cassettes 3. On the midstream portion of the conveyance path 15, the above secondary transfer area 13 is provided. On the downstream portion of the conveyance path 15, a fixing device 17 is provided. At the downstream end of the conveyance path 15, a sheet discharge part 18 is provided.

Next, an image forming operation at the print job of the multifunctional peripheral 1 will be described. The multifunctional peripheral 1 starts the image forming operation when print date and the print job are received from a user terminal 23 (see FIG. 2) through a communication part 22 (see FIG. 2).

First, in each image forming part 11, after the charger charges the photosensitive drum, the exposure part 12 exposes the photosensitive drum based on the print data, and an electrostatic latent image is formed on the photosensitive drum. The electrostatic latent image on the photosensitive drum is developed by the corresponding development device into a toner image of each color. The toner image of each color on the photosensitive drum is primarily transferred on the surface of the intermediate transfer belt 10 by the primary transfer part. The above operation is sequentially performed by the four image forming part 11, and then a full-color toner image is formed on the intermediate transfer belt 10. The toner image is conveyed to the secondary transfer area 13 by the traveling of the intermediate transfer belt 10 at a predetermined secondary transfer timing.

The sheet stored in the sheet feeding cassette 3 is fed by the sheet feeding part 16 and is conveyed along the sheet conveyance path 15. The sheet on the conveyance path 15 is conveyed to the secondary transfer area 13 at the above predetermined transfer timing. At the secondary transfer area 13, the toner image on the intermediate transfer belt 10 is secondarily transferred to the sheet. The sheet on which the toner image is secondarily transferred is conveyed downstream of the conveyance path 15. Then, the fixing device 17 fixes the toner image on the sheet, and then the sheet is discharged by the discharge part 18 on the discharge tray 4.

Figure 2:
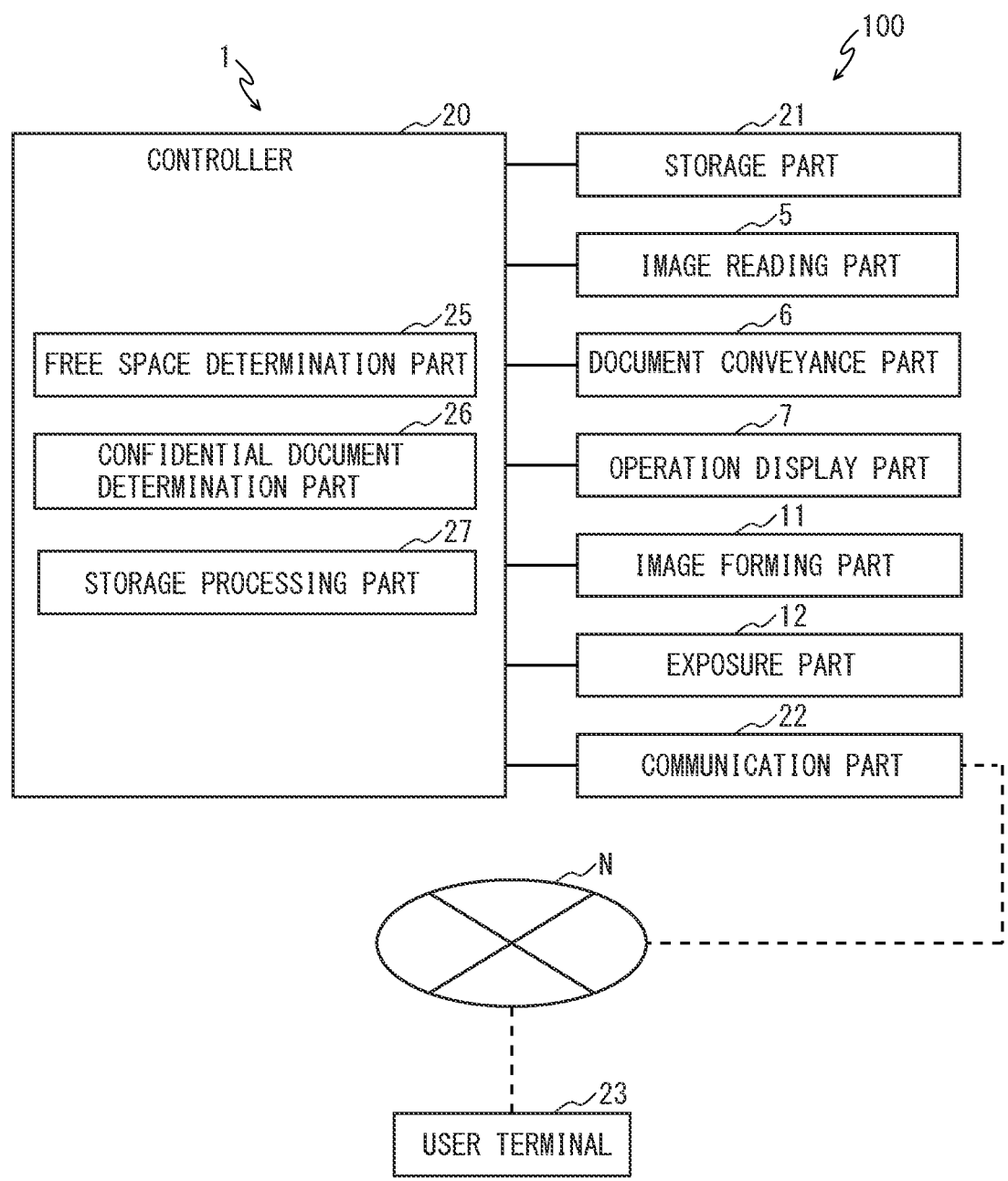
FIG. 2 is a block diagram showing an electrical configuration of the multifunctional peripheral according to the embodiment of the present invention.

Next, an electric configuration of the above multifunctional peripheral 1 will be described with reference to FIG. 2. The multifunctional peripheral 1 includes a controller 20 consisting of a CPU and the others, and a storage part 21 consisting of ROM, RAM, HDD and the others.

The controller 20 executes arithmetic processing based on control program and control data stored in the storage part 21 to control each element of the multifunctional peripheral 1 connected to the controller 20. For example, the controller 20 is connected to the elements such as the image reading part 5, the document conveyance part 6, the operation display part 7, the image forming parts 11 and the exposure part 12, and controls these elements.

The storage part 21 stores, for example, the print data received from the user terminal 23 and various other data. The storage part 21 cannot store data exceeding a storage capacity, that is, an area in which data can be stored is limited. For this reason, the storage part 21 is provided with a storage area for storing the print data, and for example, the storage area is configured to have a storage capacity of a storage enable capacity×a predetermined coefficient (for example, 0.8).

Further, the controller 20 is connected to the communication part 22 of an interface which communicatively connects the multifunctional peripheral 1 to a network N such as a LAN or the Internet. The communication part 22 communicatively connects the multifunctional peripheral 1 to the external user terminal 23 through the network N. Thus, the multifunctional peripheral 1 constitutes an image forming system 100 together with the user terminal 23 and the network N.

The user terminal 23 is a computer such as a personal computer or a tablet terminal capable of communicating with the multifunctional peripheral 1, and a printer driver capable of using the multifunctional peripheral 1 is mounted thereon. The user terminal 23 is provided with a storage medium such as HDD having a predetermined shared folder, and the shared folder is disclosed so as to be accessible to the multifunctional peripheral 1 through the network N.

For example, when a document file, a spreadsheet file, an image file or the like is printed as an original file, the user terminal 23 converts the original file into print data of a printer language corresponding to the multifunctional peripheral 1 by the printer driver mounted on the user terminal 23. A file name of the print data may be generated with including the file name of the original file, and the print data may include the same file property as that of the original file. Further, the user terminal 23 transmits the print data to the multifunctional peripheral 1 together with the print job including user information specific to the user terminal 23.

The communication part 22 receives the print job and the print data from the user terminal 23 through the network N.

In a case where the original file is a confidential document, the user terminal 23 may write a character or a mark indicating a confidential document on the original file, or contain a character indicating a confidential document in the file name of the original file (that is, the file name of the print data) and the file property of the original file (that is, the file property of the print data).

The controller 20 executes the program stored in the storage part 21 to function as a free space determination part 25, a confidential document determination part 26 and a storage processing part 27 in order to store the print data received from the user terminal 23 so as to be reprinted.

The free space determination part 25 determines that the storage part 21 contains a free space for storing the print data, as a first storage condition for storing the print data in the storage part 21. At this time, the free space determination part 25 confirms a capacity of the print data and a capacity of the free space contained in the storage area of the storage part 21. Then, when the free space is sufficiently larger than the print data, for example, when the capacity of the free space is larger than the capacity of the print data, or when the capacity of the free space×the predetermined coefficient (for example, 0.8) is larger than the capacity of the print data, the free space determination part 25 determines that the storage part 21 contains a free space for storing the print data and the first storage condition is satisfied.

When the capacity of the print data exceeds an upper limit threshold value (for example, several GB), even if the free space is larger than the print data, the free space determination part 25 may determine that the storage part 21 does not contain a free space for storing the print data and the first storage condition is not satisfied. Thus, it becomes possible to suppress sudden consumption of the storage area of the storage part 21.

The confidential document determination part 26 determines that the print data is not a confidential document, as a second storage condition for storing the print data in the storage part 21. For example, the confidential document determination part 26 generates image data of the image to be formed on the sheet by the multifunctional peripheral 1 based on the print data as a print image. The confidential document determination part 26 analyzes the print image, performs a character confirming processing and generates text data of the print image. Then, the confidential document determination part 26 searches a character indicating a confidential document such as "confidential" from the text data.

When the character indicating a confidential document is not searched from the text data, the confidential document determination part 26 determines that the character indicating a confidential document is not written in the print image and the second storage condition is satisfied. On the other hand, when the character indicating a confidential document is searched from the text data, the confidential document determination part 26 determines that the character indicating a confidential document is written in the print image and the second storage condition is not satisfied.

Alternatively, the confidential document determination part 26 previously registers various marks indicating a confidential document in the storage part 21, analyzes the print image, performs a matching processing with the previously registered mark, and detects the mark indicating a confidential document from the print image. When the mark indicating a confidential document is not detected in the print image, the confidential document determination part 26 determines that the mark indicating a confidential document is not written in the print image and the second storage condition is satisfied. On the other hand, when the mark indicating a confidential document is detected in the print image, the confidential document determination part 26 determines that the mark indicating a confidential document is written in the print image and the second storage condition is not satisfied.

Alternatively, the confidential document determination part 26 analyzes a file name of the print data and searches a character indicating a confidential document such as "confidential" from the file name. When the character indicating a confidential document is not detected in the file name, the confidential document determination part 26 determines that the file name does not contain the character indicating a confidential document and the second storage condition is satisfied. On the other hand, when the character indicating a confidential document is detected in the file name, the confidential document determination part 26 determines that the file name contains the character indicating a confidential document and the second storage condition is not satisfied.

Alternatively, the confidential document determination part 26 analyzes a file property of the print data and searches a character indicating a confidential document such as "confidential" from the file property. When the character indicating a confidential document is not detected in the file property, the confidential document determination part 26 determines that the file property does not contain the character indicating a confidential document and the second storage condition is satisfied. On the other hand, when the character indicating a confidential document is detected in the file property, the confidential document determination part 26 determines that the file property contains the character indicating a confidential document and the second storage condition is not satisfied.

The storage processing part 27 stores the print data in the storage part 21 based on the determination result of the free space determination part 25 and the confidential document determination part 26. Specifically, when the first storage condition of the free space determination part 25 and the second storage condition of the confidential document determination part 26 are satisfied, the storage processing part 27 stores the print date in the storage part 21 in association with the user information of the user terminal 23.

On the other hand, when the first storage condition of the free space determination part 25 or the second storage condition of the confidential document determination part 26 is not satisfied, the storage processing part 27 communicates with the user terminal 23 and stores the print data in the user terminal 23. For example, the controller 20 accesses the shared folder of the user terminal 23 by the communication part 22 through the network N, and stores the print data in the shared folder. Alternatively, the controller 20 transmits a storage instruction to the user terminal 23 by the communication part 22 through the network N. The user terminal 23 temporally stores the print data at the print job, and when the storage instruction is received, the user terminal 23 stores the print data in the shared folder or another folder depending on the storage instruction.

Figure 3:
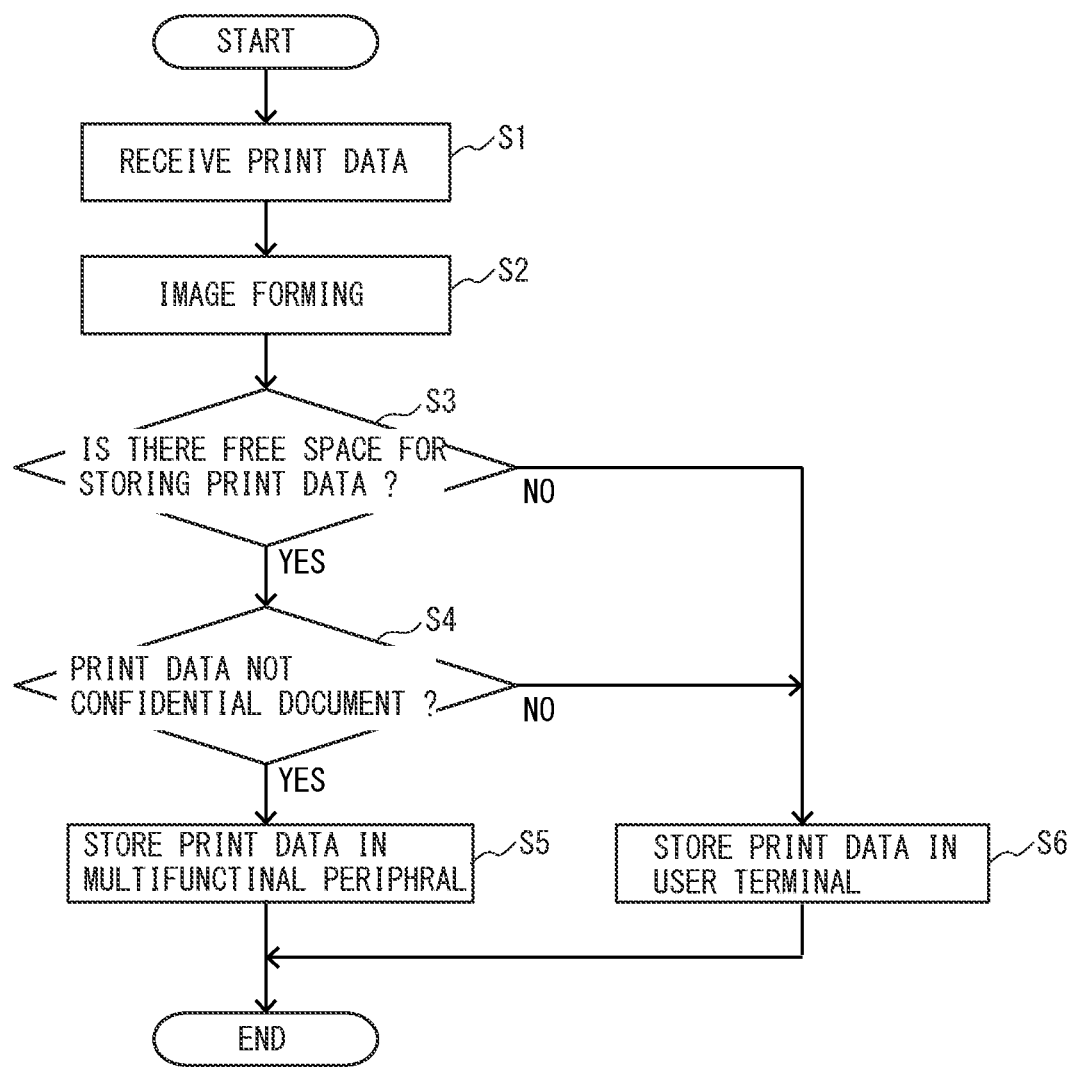
FIG. 3 is a flow chart showing a storage process of print data in the multifunctional peripheral according to the embodiment of the present invention.

Next, a print data storage operation in the multifunctional peripheral 1 will be described with reference to a flowchart shown in FIG. 3.

First, the multifunctional peripheral 1 receives the print job and the print data from the user terminal 23 by the communication part 22 through the network N (step S1). The multifunctional peripheral 1 performs the image forming operation of the print data in the above-described manner depending on the print job (step S2).

After the image forming operation is completed or in parallel with the image forming operation, the free space determination part 25 confirms a capacity of the print data and a capacity of a free space of the storage area of the storage part 21, and determines whether the storage part 21 contains a free space for storing the print data, that is, whether the first storage condition is satisfied (step S3).

When the first storage condition is satisfied (step S3: Yes), the confidential document determination part 26 analyzes the print data, and determines whether the print data is a data other than a confidential data, that is, whether the second storage condition is satisfied (step S4).

When the second storage condition is satisfied (step S4: Yes), that is, when both the first storage condition and the second storage condition are satisfied, the storage processing part 27 stores the print data in the storage part 21 in association with the user information of the user terminal 23 (step S5).

On the other hand, when the first storage condition is not satisfied (step S3: No) or when the second storage condition is not satisfied (step S4: Yes), the storage processing part 27 stores the print data in the user terminal 23 (step S6).

According to the present embodiment, as described above, the multifunctional peripheral 1 (the image forming apparatus) includes the communication part 22, the storage part 21, the free space determination part 25, and the confidential document determination part 26. The communication part 22 receives the print data from the user terminal 23 through the network N. The storage part 21 stores the print data received by the communication part 22. The free space determination part 25 determines that the storage part 21 contains a free space for storing the print data, as the first storage condition. The confidential document determination part 26 determines that the print data is not a confidential document, as the second storage condition. Then, when the first storage condition and the second storage condition are satisfied, the controller 20 (the storage processing part 27) of the multifunctional peripheral 1 stores the print data in the storage part 21 in association with the user information of the user terminal 23. On the other hand, when the first storage condition is not satisfied or when the second storage condition is not satisfied, the controller 20 communicates with the user terminal 23 and stores the print data in the user terminal 23.

According to the above configuration, it becomes possible to determine a case where the storage part 21 of the multifunctional peripheral 1 does not contain a free space for storing the print data or a case where the storage in the storage part 21 of the multifunctional peripheral 1 is impossible due to security for the print data of a confidential document, depending on input of the print data, that is, input of the print job without requiring user's effort. In these cases, it becomes possible to store the print data in the user terminal 23 properly in order to reprint the print data. Therefore, it becomes possible to inhibit a load from being applied to the storage part 21 of the multifunctional peripheral 1. Furthermore, a confidential document is not stored in the multifunctional peripheral 1 capable of being used by various users, so that security of the confidential document can be enhanced.

Accordingly, when the print job of the same original file is instructed from the user terminal 23, it becomes possible to reprint the original file using the print data stored in the user terminal 23. As described above, according to the multifunctional peripheral 1 of the present embodiment, it becomes possible to store the print data so as to be reprinted regardless of a state of the storage part 21 and a type of the print data.

For example, the free space determination part 25 may confirm a capacity of the print data, and when the storage area of the storage part 21 provided in order to store the print data contains a free space having a capacity capable of storing the print data, the free space determination part 25 may determine that the first storage condition is satisfied. Thereby, it becomes possible to perform a storage processing of the print data without hindering storage of various data other than the print data in the storage part 21.

The confidential document determination part 2 analyzes the print image based on the print data, and may determine that the second storage condition is not satisfied when a character indicating a confidential document is written in the print image. Thus, for a confidential document which the user does not desire to store in the multifunctional peripheral 1, if a character indicating the confidential document is written in the print image, the print data is stored not in the multifunctional peripheral 1 but in the user terminal 23, so that the confidential document is surely inhibited from being stored in the multifunctional peripheral 1.

The confidential document determination part 2 analyzes the print image based on the print data, and may determine that the second storage condition is not satisfied when a mark indicating a confidential document is written in the print image. Thus, for a confidential document which the user does not desire to store in the multifunctional peripheral 1, if a mark indicating the confidential document is written in the print image, the print data is stored not in the multifunctional peripheral 1 but in the user terminal 23, so that the confidential document is surely inhibited from being stored in the multifunctional peripheral 1.

The confidential document determination part 2 analyzes the file name of the print data, and may determine that the second storage condition is not satisfied when a character indicating a confidential document is written in the file name. Thus, for a confidential document which the user does not desire to store in the multifunctional peripheral 1, if a character indicating the confidential document is written in the file name, the print data is stored not in the multifunctional peripheral 1 but in the user terminal 23, so that the confidential document is surely inhibited from being stored in the multifunctional peripheral 1.

The confidential document determination part 2 analyzes the file property of the print data, and may determine that the second storage condition is not satisfied when a character indicating a confidential document is written in the file property. Thus, for a confidential document which the user does not desire to store in the multifunctional peripheral 1, if a character indicating the confidential document is written in the file property, the print data is stored not in the multifunctional peripheral 1 but in the user terminal 23, so that the confidential document is surely inhibited from being stored in the multifunctional peripheral 1.

The confidential document determination part 26 may determine that the second storage condition is not satisfied if at least one state of the following states is applied to the print data: a state where a character indicating a confidential document is written in the print image; a state where a mark indicating a confidential document is written in the print image; a state where a character indicating a confidential document is contained in the file name; and a state where a character indicating a confidential document is contained in the file property. When a combination of two or more of the above states is applied to the print data, because certainly that the print data is a confidential document is increased, the confidential document determination part 26 may determine that the second storage condition is not satisfied, more preferably, when all of the above states are applied to the print data, the confidential document determination part 26 may determine that the second storage condition is not satisfied.

The above embodiment describes an example where the print data is stored in the storage part 21 when both the first storage condition and the second storage condition are satisfied, however, the present invention is not limited to the example. For example, in other embodiments, when one of the first storage condition and the second storage condition is satisfied, the print data may be stored in the storage part 21.

The above embodiment describes an example where the print data is stored in the user terminal 23 when the first storage condition is not satisfied or when the second storage condition is not satisfied, however, the present invention is not limited to the example. For example, in other embodiment, when both the first storage condition and the second storage condition are not satisfied, the print data may be stored in the user terminal part 23.

The above embodiment describes an example where the user terminal 23 converts the original file to the print data and transmits the print data to the multifunctional peripheral 1, however, the present invention is not limited to the example. For example, in other embodiments, the user terminal 23 may transmit the original file to the multifunctional peripheral 1, and the multifunctional peripheral 1 may convert the original file to the print data.

In the above embodiment, the example where the configuration of the present invention is applied to the multi-function peripheral 1 has been described, but in other different embodiments, the configuration of the present invention may be applied to other image forming apparatuses such as a printer, a copying machine, a facsimile, and the others.

The description of the present embodiment shows an example of the image forming apparatus according to the present disclosure, and the technical range of the present invention is not limited to the present embodiment.

The invention claimed is:

1. An image forming apparatus comprising:
   a controller consisting of a CPU;
   a communication part which receives print data from a user terminal through a network; and
   a storage part which stores the print data received by the communication part;
   the controller executes a program stored in the storage part to function as:
   a free space determination part which determines that the storage part contains a free space for storing the print data, as a first storage condition;
   a confidential document determination part which determines that the print data is not a confidential document, as a second storage condition; and
   a storage processing part which stores the print data in the storage part in association with user information of the user terminal when the first storage condition and the second storage condition are satisfied, and communicates with the user terminal and stores the print data in the user terminal when the first storage condition is not satisfied or when the second storage condition is not satisfied.

2. The image forming apparatus according to claim 1, wherein
   the free space determination part confirms a capacity of the print data, and determines that the first storage condition is satisfied when a storage area of the storage part provided for storing the print data contains the free space having a capacity capable of storing the print data.

3. The image forming apparatus according to claim 1, wherein
   the confidential document determination part analyzes a print image based on the print data, and determines that the second storage condition is not satisfied when a character indicating a confidential document is written in the print image.

4. The image forming apparatus according to claim 1, wherein
   the confidential document determination part analyzes a print image based on the print data, and determines that the second storage condition is not satisfied when a mark indicating a confidential document is written in the print image.

5. The image forming apparatus according to claim 1, wherein
   the confidential document determination part analyzes a file name of the print data, and determines that the second storage condition is not satisfied when the file name contains a character indicating a confidential document.

6. The image forming apparatus according to claim 1, wherein
   the confidential document determination part analyzes a file property of the print data, and determines that the second storage condition is not satisfied when the file property contains a character indicating a confidential document.

7. The image forming apparatus according to claim 1, wherein
   when a capacity of the print data exceeds a predetermined upper limit threshold value, even if the free space is larger than the print data, the free space determination part determines that the storage part does not contain the free space for storing the print data and the first storage condition is not satisfied.

8. The image forming apparatus according to claim 1, wherein
   when the first storage condition or the second storage condition is not satisfied, the storage processing part accesses a shared folder of the user terminal by the communication part through the network, and stores the print data in the shared folder.

* * * * *